United States Patent [19]

Knoll

[11] 4,029,388

[45] June 14, 1977

[54] ELECTRICAL TERMINAL CONSTRUCTED TO PREVENT INSERT MOLDING FLASH

[75] Inventor: Carl G. Knoll, Melrose Park, Ill.

[73] Assignee: Illinois Tool Works Inc., Chicago, Ill.

[22] Filed: Apr. 2, 1976

[21] Appl. No.: 673,225

[52] U.S. Cl. .............................. 339/218 R; 249/96; 264/272; 264/276

[51] Int. Cl.$^2$ ..................... H01R 13/40; B29D 3/00

[58] Field of Search ........... 339/218; 264/261, 272, 264/276; 425/123; 249/96, 97

[56] References Cited

UNITED STATES PATENTS

| | | | |
|---|---|---|---|
| 1,726,745 | 9/1929 | Kulka | 339/218 R |
| 3,081,497 | 3/1963 | Scherry | 264/276 |
| 3,210,453 | 10/1965 | Smith | 264/272 |
| 3,284,758 | 11/1966 | Klumpp, Jr. | 339/218 R |

FOREIGN PATENTS OR APPLICATIONS

| | | | |
|---|---|---|---|
| 509,402 | 7/1939 | United Kingdom | 339/218 R |

*Primary Examiner*—Roy Lake
*Assistant Examiner*—Neil Abrams
*Attorney, Agent, or Firm*—Glenn W. Bowen; Robert W. Beart

[57] ABSTRACT

A flat contact terminal for use in small switches is disclosed which is constructed to prevent flash, or escapement of material from a mold, when the contact terminal is insert-molded into the plastic base of the switch. The contact terminal is deformed to provide angled surfaces on the contact terminal at the upper and lower surfaces of the base where the terminal extends from the base so that the angled surfaces of the contact terminal are wedged tightly against corners of the mold, thereby preventing the escape of plastic material from the mold during molding of the base around the terminal.

3 Claims, 5 Drawing Figures

Fig. 1
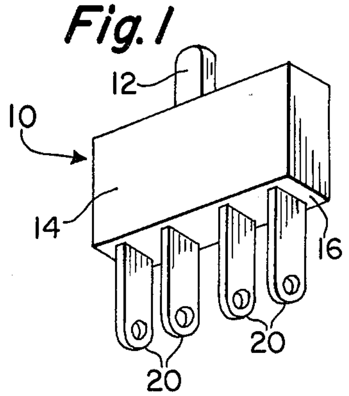
Fig. 2
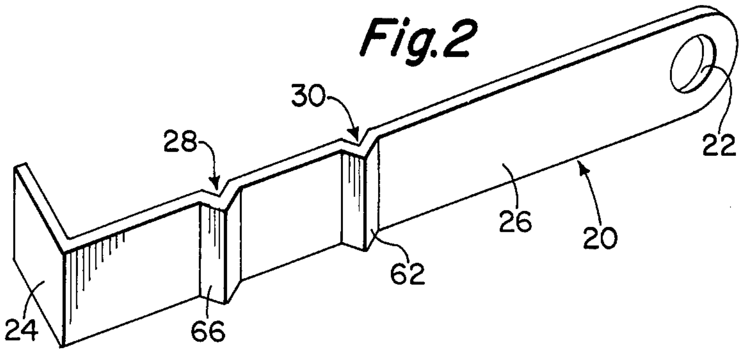
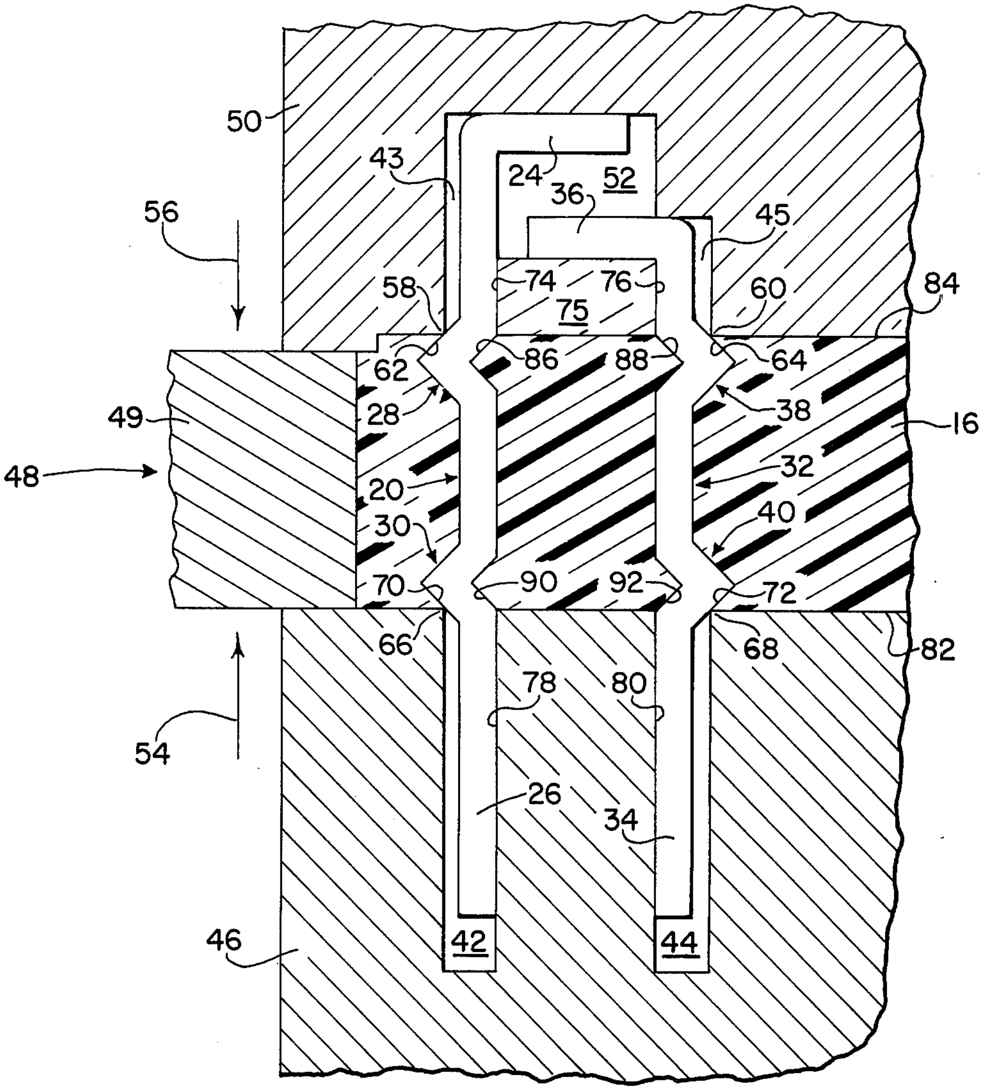
Fig. 3

Fig.4
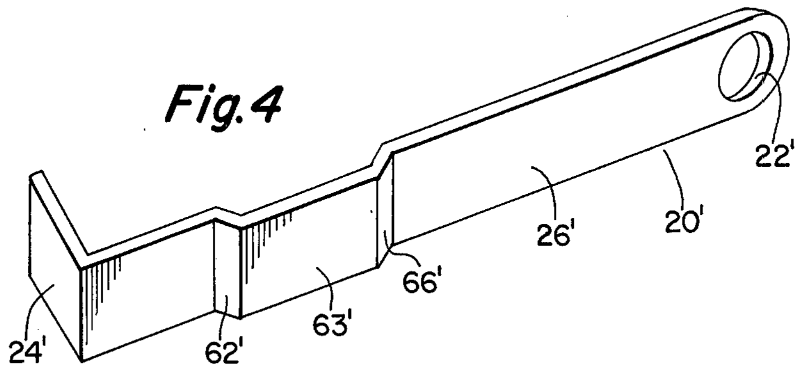
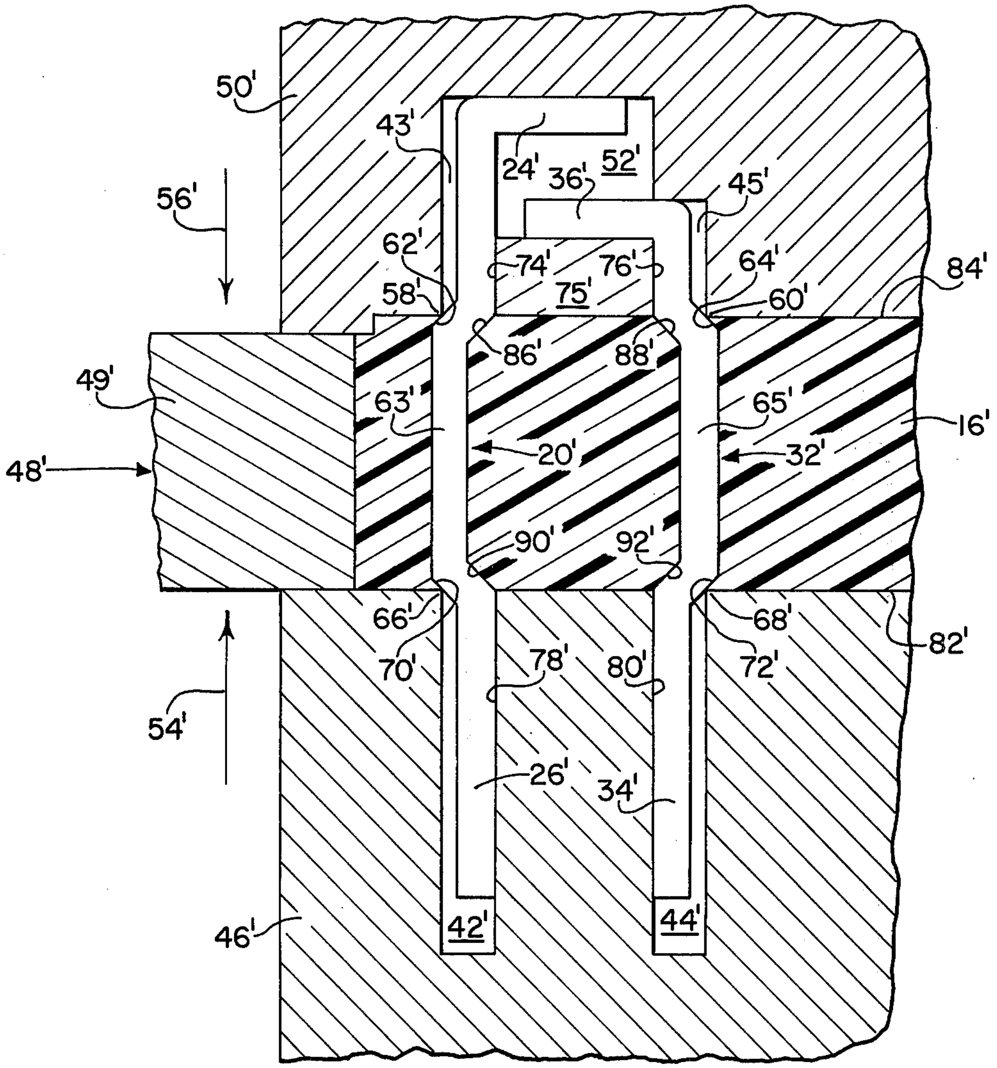
Fig.5

ELECTRICAL TERMINAL CONSTRUCTED TO PREVENT INSERT MOLDING FLASH

BACKGROUND OF THE INVENTION

The insert molding of contact terminals into plastic support members in electrical products, such as switches, terminal boards, relays and other types of components is an advantageous method which has been employed for a number of years. The contact terminals generally project through the support member in opposite directions, with one portion of the contact terminal being used to interconnect the switch into a printed circuit board or to a wire which is soldered to the contact terminal and the other portion of the contact terminal serving as a contact member for the switch or other device.

In recent years great advances have been made in reducing the size of electrical circuit components through the employment of semiconductor technology. As the size of the overall circuit decreases in a given application, the demand for smaller auxillary components, such as switches, relays, terminal boards and the like, becomes greater. In the manufacture of such components, the tendency of the plastic molding procedure to produce flash on surface areas of the contact terminal, which must be free of material for satisfactory operation, generally requires an additional flash removal step which is time-consuming and expensive.

One proposal for solving the flash problem is found in U.S. Pat. No. 3,210,453 issued Oct. 5, 1965to Zeke R. Smith. The solution of the Smith patent was to provide a body portion intermediate the ends of the flat contact terminal which was of an appreciably larger cross-sectional area than the remainder of the contact terminal. This solution, however, limits the reduction of the size of the switch, or other electrical component, substantially because of the enlarged area that is provided, thereby imposing an unnecessary restriction on the design of small electrical components. Moreover, providing the enlarged area is relatively expensive with respect to the solution of the problem that is provided by the present invention.

DESCRIPTION OF THE DRAWINGS

The present invention is illustrated by reference to the drawings in which:

FIG. 1 is a perspective view of a small electrical switch which utilizes the contact terminals of the present invention;

FIG. 2 is a perspective view of one embodiment of a contact terminal structure formed in accordance with the present invention;

FIG. 3 is a partial cross-sectional view of the mold for the base of the switch of FIG. 1 with two insert-molded terminals that are constructed in accordance with the structure of FIG. 2 being molded into the base.

FIG. 4 is a perspective view of a second contact terminal embodiment of the present invention; and FIG. 5 is a partial cross-sectional view of the mold for the base of the switch of FIG. 1 with two insert-molded terminals that are constructed in accordance with the structure of FIG. 4 being molded into the base.

TECHNICAL DESCRIPTION OF THE INVENTION

The contact terminals of the present invention are useful in applications such as very small electrical components. For example, they may be used in the miniature switch 10 of FIG. 1. The switch 10 has an actuator button 12, a housing 14 and a separate base 16 through which the contact terminals 20 extend. The switch 10 itself may be constructed in various ways, including those shown in co-pending application Ser. No. 617,086, filed Sept. 26, 1975 in the name of Charles C. Camillo, and assigned to the assignee of the present invention.

The presently preferred embodiment of the present invention is shown in FIGS. 2 and 3 where an elongated, substantially flat contact terminal 20 of a rectangular cross-section has a hole 22 at the end of the extending portion of the contact terminal which projects downwardly through the base so as to receive a wire, if desired, and a contact portion 24, which is bent at a right angle to the remainder of the contact terminal 20, at the end of the extending portion of the contact terminal 20 which projects into the housing 14 of the switch 10. The contact portion 24 may carry a conventional contact element or alternately it may be coated with a highly conductive alloy, such as gold or silver, if desired. The contact terminal 20 is preferably formed of a beryllium-copper alloy, or other conventional conductive material. There are provided two V-shaped deformations 28, 30 along the length of the long segment 26 of the contact terminal 20. The two deformations 28, 30 are spaced apart approximately the thickness of the base 16. These two deformations constitute the improvement of the preferred embodiment, although deformations having other configurations are within the scope of the present invention. The purpose of the deformations 28, 30, which are located at the beginning of each of the portions of the contact terminals which extend through the base 16 in opposite directions, is to prevent flash of the plastic material that is used to form the base when it is molded around the terminal 20, and a similar but shorter terminal 32. The terminal 32 has an elongated section 34, a contact portion 36 and a pair of spaced apart deformations 38, 40, and except for its length and its orientation, is identical to terminal 20 in the illustrated embodiment. The manner that the flash is prevented with the contact terminals of the invention results from the way they interact with the mold for the base 16.

The contact terminals 20, 32 are inserted into the elongated generally rectangular shaped slots 42, 44 respectively, in the side core 46 of the mold 48. The lower side core 46 and the upper side core 50, which has a recess 52 and the slots 43, 44 for receiving the extending portions of the terminals 20, 32 which project into the switch, then close by moving toward each other and the stationary section 49 of the mold, in the direction of the arrows 54, 56, respectively. When the side cores 46, 50 are clamped together, the corners 58, 60 of the upper side core 50 are wedged tightly against the surfaces 62, 64 of the deformations 28, 38 which form acute angles with the elongated sections 26 and which slope toward each other at approximately a 45° angle with respect to the flat elongated portion 26. These surfaces 62, 64 substantially prevent the plastic material that is used to mold the base 16 from escaping from the mold, thereby reducing flash. In a similar manner, the corners 66, 68 fo the lower side core 46 are tightly wedged against the angled surfaces 70, 72 of the deformations 30, 40 respectively to prevent flash in this area. The pressure of the corners 58, 60, 66 and 68 of the mold against the angled surfaces 62, 64, 70 and 72 also serves to force the contact terminals 20, 32 tightly against the side walls 74, 76 of the slots 43, 45 of the mold member 75, which may move into position in a direction normal to the direction defined by the arrows 54, 56, and the side walls 78, 80 of the slots 42, 44 of the lower core 46, thereby substantially preventing any flash from occurring in these locations.

The illustrated embodiment of FIGS. 2 and 3 is presently preferred because of its ease of manufacture since the V-shaped deformations 28, 30, 38, 40 may be made simply by striking the contact terminals with a die, however, the present invention does contemplate other structures which provide the claimed features. One alternate type of structure is shown in FIGS. 4 and 5 where elements similar to those of FIGS. 2 and 3 are designated with the same prime numbers as those found in FIGS. 2 and 3, since the description with respect to these elements applies also to FIGS. 4 and 5. The only difference between the structure of the contact terminals of FIGS. 2 and 3 and those of FIGS. 4 and 5 is that the deformation that is formed in the elongated portion 26′ of the contact terminal 20′ is that it is provided with a single deformation which has the angled surface 62′, 64′ at the outer ends of the deformation and these surfaces are joined by the flat surface 63′ which runs substantially parallel to the flat elongated section 26′ of the terminal 20′. The contact terminal 32′ has a similar deformation with a substantially flat surface 65′. The prevention of flash occurs in the same manner when either the contact terminal of FIG. 2 or the contact terminal of FIG. 4 are employed. Preferably, the angled surfaces 62, 64, 70 and 72 and the angled surfaces 62′, 64′, 70′ and 72′ are positioned with respect to the top and bottom surfaces 82, 84 of the base 16 and the top and bottom surfaces 82′,84′ of the base 16′ so that these surfaces will be located approximately half inside of the base and half outside of it when the base is molded. The inner surfaces 86, 88, 90, 92 of the deformations 28, 38, 30 and 40 and the inner surfaces 86′, 88′, 90′ and 92′ of the deformations 28′, 38′, 30′ and 40′ are preferably located wholly inside of the molded base.

What is claimed is:

1. A base assembly for an electrical switch comprising a support member of molded plastic material and at least one elongated, substantially flat electrical contact terminal which has first and second substantially straight elongated segments which have first and second opposed sides, each of said elongated segments extending from one of a pair of substantially parallel surfaces of said support member in substantially a normal direction to its associated surface, and first and second substantially straight angled segments, each of which makes an angle with respect to one of said elongated segments and which emerges from said associated surface of said support member, wherein said contact terminals are molded into said support member with a reduced amount of flash by an insert-molding process which is achieved with a mold that is constructed to have a corner for each angled segment that is located on said first side of said elongated segment so as to be tightly wedged against said angled segment at the point where said angled segment emerges from its associated surface of said support member during said molding process and an associated elongated substantially flat area which is located on said second side of said elongated segment so as to be firmly forced against said second side of the associated contact terminal during said molding process.

2. A base assembly for an electrical switch as claimed in claim 1 wherein said angled segments each form one segment of a V-shaped deformation of said contact terminal.

3. A base assembly for an electrical switch as claimed in claim 1 wherein said first and second angled segments on each contact terminal form a part of a deformation of said contact terminal which is formed so that said angled segments are joined by a segment which is substantially parallel to said elongated segments.

* * * * *